United States Patent [19]

Hagiwara et al.

[11] Patent Number: 4,540,553

[45] Date of Patent: Sep. 10, 1985

[54] DESULFURIZING AGENT

[75] Inventors: Hiroshi Hagiwara, Urawa; Masaru Shirasaka, Tokyo; Hajime Nagayama, Hino, all of Japan

[73] Assignee: Onoda Cement Co., Inc., Yamaguchi, Japan

[21] Appl. No.: 688,273

[22] Filed: Jan. 2, 1985

Related U.S. Application Data

[63] Continuation of Ser. No. 535,697, Sep. 26, 1983, abandoned.

[51] Int. Cl.³ .............................................. B01D 53/34
[52] U.S. Cl. ..................................... 423/230; 423/244
[58] Field of Search .................. 106/97; 423/230, 231, 423/210, 244 R, 244 A

[56] References Cited

U.S. PATENT DOCUMENTS

| | | | |
|---|---|---|---|
| 2,572,510 | 10/1951 | Orsini | 106/97 |
| 2,758,033 | 8/1956 | Burney et al. | 106/97 |
| 3,489,582 | 1/1970 | Lindgren et al. | 106/97 |
| 3,558,526 | 1/1971 | Hall et al. | 106/97 |
| 3,582,377 | 6/1971 | Hays et al. | 106/97 |
| 3,853,570 | 12/1974 | Nonis et al. | 106/97 |
| 4,316,813 | 2/1982 | Voss | 423/244 X |
| 4,390,372 | 6/1983 | Hardin | 106/97 |
| 4,405,372 | 9/1983 | Serafin et al. | 106/97 |

Primary Examiner—Earl C. Thomas

[57] ABSTRACT

A hardened product prepared by mixing cement with limestone or dolomite and hardening it by incorporating water can be used as a heat medium for a fluidized bed heating furnace and also act as a preferred desulfurizing agent having a high desulfurizing performance which can effectively absorb to eliminate the sulfur components in exhaust or product gases from the heating furnace.

The strength as the heat medium and the desulfurizing performance can further be increased by setting the cement content in the mixture between 10–70% by weight and the particle size for the mixture between 0.7 and 2.0 mm.

Furthermore, the desulfurizing agent can be produced preferably by previously setting the particle size of the mixture to less than 0.3 mm and then adding 5–20% by weight of the seed material between 0.3 mm and 1.2 mm in particle size, followed by pelletization.

2 Claims, 9 Drawing Figures

RESULT FOR SO₂ ABSORPTION TEST

RESULT FOR SO₂ ABSORPTION TEST

RESULT FOR H₂S ABSORPTION TEST

RESULT FOR SO₂ ABSORPTION TEST

RESULT FOR H₂S ABSORPTION TEST

RESULT FOR SO₂ ABSORPTION TEST

RESULT FOR ABRASION LOSS OF A HEAT MEDIUM

RESULT FOR SO₂ ABSORPTION TEST

RESULT FOR ABRASION LOSS OF A HEAT MEDIUM

DESULFURIZING AGENT

This application is a continuation of application Ser. No. 535,697, filed Sept. 26, 1983, and now abandoned.

BACKGROUND OF THE INVENTION

This invention concerns a desulfurizing agent suitable for removing $SO_2$ and /or $H_2S$ in a fluidized bed type heating furnace.

A fluidized bed heating furnace has various merits in that it can use low calory fuels or bulky fuels, operate at low $NO_x$ value and facilitate desulfurization of exhaust gases, as well as requiring less installation cost. In view of such merits, the fluidized bed heating furnace is now being utilized more and more in various types of combustion furnaces, incinerators for city dust and sludge for gasifying furnaces for solid fuels, etc.

Since it is now necessary to use fuels of high sulfur content or to gasify solid fuels of high sulfur content or to gasify solid fuels of high sulfur content because of the recent increases in energy cost, the sulfur concentration in exhaust gases or product gases from the fluidized bed heating furnace is inevitably increased. In addition, since city dust or sludge is mainly composed of waste matter such as garbage and sewage and contains sulfur at high concentration, exhaust gases, which are the result of burning such waste matter, also contain a high level of sulfur, which leads to undesired atmospheric pollution.

In view of such increasing environmental contamination, and in order to balance the conflict between the pollution caused by industrial waste and the clean atmosphere desired by human beings, there is a strong demand for a desulfurizing agent of high performance at a low cost and easy to handle. However, the desulfurizing agents available at present are not always satisfactory from the foregoing viewpoints.

Those desulfurizing agents employed so far in the fluidized bed heating furnace as a heat medium and desulfurizer include natural carbonate ores such as limestone or dolomite which are mainly composed of CaO or MgO, as well as industrial products such as portland cement clinker or a hardened hydration product of portland cement mainly composed of CaO, but these products have inherent merits and demerits. Namely, limestone and dolomite are available at low cost. However, since they are sedimentary ores having water content and great density, they tend to collapse and to issue a large volume of scattered dust when used as a heating medium and do not attain a sufficient desulfurizing effect unless they are used in great amounts. Furthermore, although the cement clinker or the hardened product of cement can be used stably as the heat medium, they fail to provide a sufficient desulfurizing effect.

SUMMARY OF THE INVENTION

Accordingly, one object of this invention is to provide a desulfurizing agent that can be used as a heat medium for a fluidized bed heating furnace and has a high desulfurizing effect as well. According to this invention, this object can be obtained by a desulfurizing agent that comprises a hardened product prepared from a mixture of cement and limestone or a mixture of cement and dolomite which is hardened by incorporating water.

Another object of this invention is to provide a desulfurizing agent comprising 100–70% by weight of cement in the above-mentioned mixture and, accordingly, having the desired strength as the heat medium and a high desulfurizing effect as well.

A further object of this invention is to provide a suitable process for producing such a desulfurizing agent wherein the particle size of the mixture is adjusted to less than 0.3 mm, and 5–20 % w of seed material which is 0.3–1.2 mm in particle size are added to the mixture, followed by pelletization.

BRIEF DESCRIPTION OF THE DRAWINGS

FIGS. 1, 3, 5 and 7 are graphs showing the results of a test for $SO_2$ absorption;

FIGS. 2 and 4 are graphs showing the results of a test for $H_2S$ absorption;

FIGS. 6 and 8 are graphs showing the abrasion loss of a heat medium;

FIG. 9 is a graph showing the contents of pellets of 1.0–2.0 mm in particle size.

DETAILED DESCRIPTION OF THE INVENTION

Figure 1:
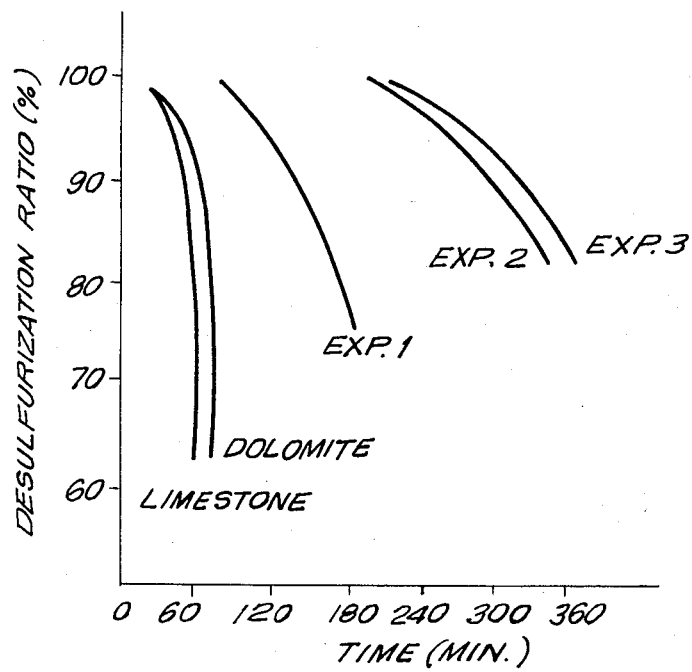
FIG. 1 through FIG. 9 are graphs showing the results of tests for a desulfurizing agent in Experimental Examples of this invention.

The present inventors, in weighing the foregoing merits and demerits of the prior art products, have made various studies for developing a desulfurizing agent that can be used at the desired stability as a heat medium and that also has a high desulfurizing effect for use in a fluidized bed heating furnace and, as the result, have obtained the findings as shown below.

Limestone and dolomite are more readily collapsible when exposed to high temperatures but less effective for desulfurization as the ore particle size thereof becomes larger, because water is included in the ores at the grain boundary thereof and its content will then possibly be greater, which may cause exploding phenomena when the ore is heated to high temperature. Further, both limestone and dolomite are rendered porous when they are decarbonated at high temperature. However, since the pore diameter formed by the decarbonation is small, the pores are blocked with products that are the result of their reaction with $SO_2$ or $H_2S$, which restricts the site of the reaction between $SO_2$ or $H_2S$ and the desulfurizing agent only at or near the surface area. Thus, the surface area of the desulfurizing agent available for the reaction decreases as the particle size increases, to thereby reduce the desulfurizing effect.

Referring now to the cement clinker; it is a dense clinker consisting mainly of calcium silicate that usually is sintered at high temperature above 1450° C. Consequently, although the cement clinker has a sufficient strength as a heat medium, its desulfurizing performance is far inferior to limestone or dolomite since the reaction of calcium silicate with $SO_2$ or $H_2S$ at high temperature is significantly lower than that of CaO or MgO.

On the other hand, the hardened product of portland cement is composed mainly of $CaO-SiO_2-H_2O$ hydrate and $Ca(OH)_2$, which are substantially converted into calcium silicate and CaO when heated above 500° C. Although CaO is highly reactive with $SO_2$ or $H_2S$, since it is usually formed only by about 15–25% in this case, the desulfurizing performance is not satisfactory as a whole. However, its stability at a high temperature has been found to be excellent.

Based on the foregoing findings, we have conducted various experiments and, as the result, have found that a hardened product prepared by hardening a mixture of pulverized limestone or dolomite with cement and incorporating water is excellent in the absorbing performance for $SO_2$ or $H_2S$ because the hardened product has pores large enough to allow $SO_2$ or $H_2S$ to easily penetrate into the inside and also has a great porosity, as well as that the stability as the heat medium at high temperature can be maintained since the particles of the limestone or dolomite are bonded to each other by the calcium silicate layer of hydrated cement.

This invention has been based on the foregoing findings and the desulfurizing agent according to this invention comprises a hardened product prepared from a mixture of cement and limestone or a mixture of cement and dolomite by hardening the same by incorporating water.

The cement usable in this invention includes, for example, various types of portland cement such as ordinary portland cement, and rapid-hardening portland cement, mixed cement such as blast furnace cement, silica cement, fly-ash cement, etc.

Explanation will be made specifically hereinafter for the presence or absence of limestone and dolomite and the mixing ratio of limestone or dolomite as well as the particle size of the mixture based on the following experimental examples.

EXPERIMENTAL EXAMPLE 1

Ordinary portland cement, limestone and dolomite, each having the chemical composition as described in Table-1 were mixed in each ratio as described in Table-2, hardened by incorporating water and cured at a curing temperature of 20±3° C. and a curing humidity (RH%) of greater than 80% for seven days to prepare hardened products of cement. The limestone and dolomite used were pulverized to less than 0.5 mm in particle size.

TABLE 1

| Material | Chemical Composition (%) | | | | | |
|---|---|---|---|---|---|---|
| | Ig. Loss | $SiO_2$ | $Al_2O_3$ | $Fe_2O_3$ | CaO | MgO |
| Ordinary Portland Cement | 0.6 | 22.2 | 5.0 | 3.3 | 65.1 | 1.4 |
| Limestone | 42.4 | 1.5 | 0.9 | 0.6 | 53.4 | 0.7 |
| Dolomite | 44.7 | 0.6 | 0.2 | 0.5 | 35.1 | 18.1 |

TABLE 2

| Experiment No. | Material Used (wt %) | | | Water-Cement Ratio (w/c) |
|---|---|---|---|---|
| | Cement | Limestone | Dolomite | |
| 1. (Comparative example) | 100 | 0 | 0 | 0.30 |
| 2. (This invention) | 33 | 66 | 0 | 0.65 |
| 3. (This invention) | 33 | 0 | 66 | 0.65 |

The hardened products prepared as above were dried at 110° C. for 24 hours and then pulverized to 0.59–1.19 mm in particle size. Each 2 g of the pulverized hardened products thus prepared was charged in a fixed bed and an absorption test for $SO_2$ or $H_2S$ was carried out by passing gases containing $SO_2$ or $H_2S$ through the fixed bed. For the comparison, limestone and dolomite were separately pulverized in the same particle size to prepare samples for the test.

The conditions for the test are shown below as follows:

$SO_2$ Absorption Text
  Gas composition: $SO_2$ 700 ppm, $O_2$ 5%, $CO_2$ 12%, balance of $N_2$
  Gas flow rate: 1 l/min
  Fixed bed cross-sectional area: 7.09 cm$^2$
  Fixed bed temperature: 850° C.
$H_2S$ Absorption Test
  Gas composition: $H_2S$ 500 ppm, balance of $N_2$
  Gas flow rate: 1 l/min
  Fixed bed cross-sectional area: 7.09 cm$^2$
  Fixed bed temperature: 850° C.

Figure 2:
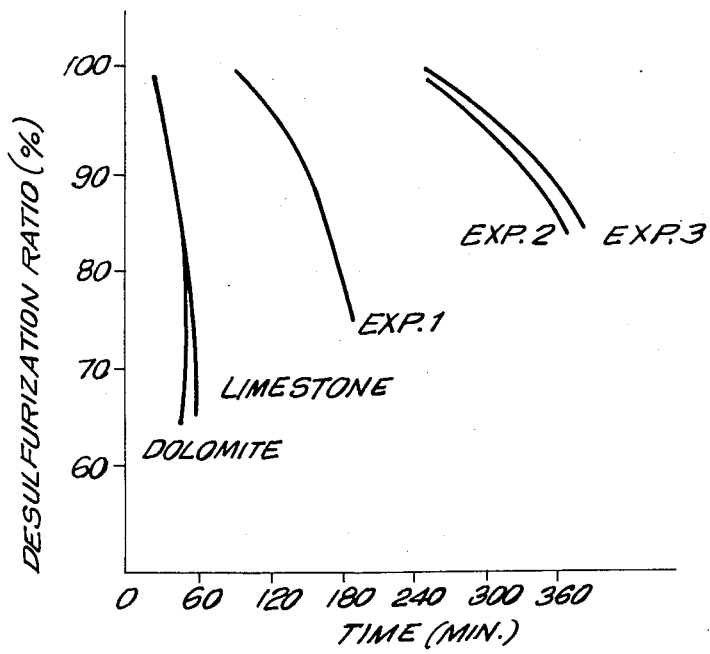

The results of the test are shown in FIG. 1 and FIG. 2, in which the desulfurizing ratio was calculated according to the following plan :

Desulfurizing ratio ($SO_2$ or $H_2S$) (%) =

$$\frac{SO_2 \text{ or } H_2S \text{ concentration at inlet (ppm)} - SO_2 \text{ or } H_2S \text{ concentration at exit (ppm)}}{SO_2 \text{ or } H_2S \text{ concentration at inlet (ppm)}} \times 100$$

As can be seen from FIG. 1 and FIG. 2, each desulfurizing agent according to this invention (Experiment No. 2, 3) is much more excellent in the absorption performance for $SO_2$ or $H_2S$ than limestone, dolomite or a hardened product of cement (Experiment No. 1) as prior products.

It is considered that such a remarkably high desulfurizing performance of the desulfurizing agent according to this invention is attributable to the fact that the $SO_2$ or $H_2S$ component can penetrate into and be absorbed into the inside of the desulfurizing agent due to the large porosity thereof (about 30% before heating) and due to the presence of coarse pores between the particles since powdery particles of the limestone or dolomite are bonded to each other by hydrated cement.

On the other hand, the particles of limestone or dolomite have an exceedingly small porosity, usually less than 1% (before heating). It is considered that although the porosity is increased by the decarbonating effect under heating, the pores thus formed are fine and, consequently, blocked with $CaSO_4$ or CaS formed as the result of absorption, for the reason that $SO_2$ or $H_2S$ hinders the penetration into the inside, which reduces the desulfurizing ratio of the limestone or dolomite in a short time as shown in FIG. 1 and FIG. 2.

The desulfurizing performance of the hardened product of cement (Experiment No. 1) is inferior because, it is considered, the content of free CaO effective to the desulfurization in the product is insufficient. Undesired powdering or sintering was not observed after the desulfurizing test for the samples of Experiment No. 1, 2, 3.

EXPERIMENTAL EXAMPLE 2

The desulfurizing performance was measured in the same manner as in Experimental Example 1 while varying the temperature for the fixed bed. The desulfurizing agent and the procedures for the test were the same as in Experimental Example 1. The results of the test are shown in FIG. 3 and FIG. 4.

Figure 3:
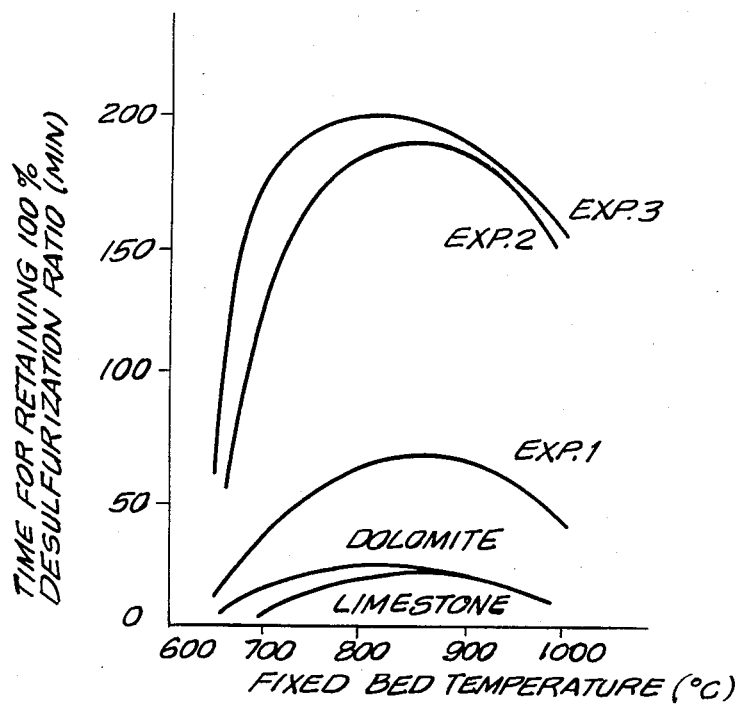
Figure 4:
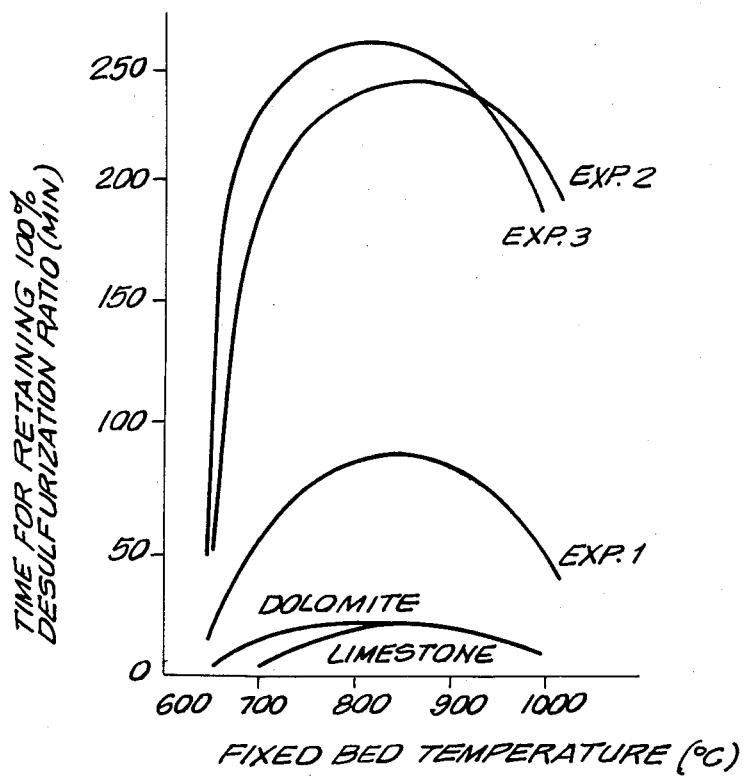

As apparent from FIG. 3 and FIG. 4, the desulfurizing agent according to this invention has a much more excellent desulfurizing performance than the prior art product (limestone, dolomite) and a hardened product of cement (Experiment No. 1) within a temperature range between 650°-950° C. for the fixed bed. Again, undesirable powderization or sintering was not observed in the samples of Experiment No. 1, 2, 3 after the desulfurizing test.

EXPERIMENTAL EXAMPLE 3

The limestone used in Experimental Example 1 was pulverized to less than 0.297 mm in particle size and rapid-hardening portland cement was mixed thereto in various mixing ratios as described in Table 3. A mixture for each kind was prepared by 1 Kg respectively.

TABLE 3

| Experiment No. | Mixing Ratio (wt %) | |
| --- | --- | --- |
|  | Rapid-hardening Portland Cement | Limestone |
| 4 | 100 | 0 |
| 5 | 70 | 30 |
| 6 | 50 | 50 |
| 7 | 33 | 67 |
| 8 | 20 | 80 |
| 9 | 10 | 90 |
| 10 | 5 | 95 |

Figure 5:
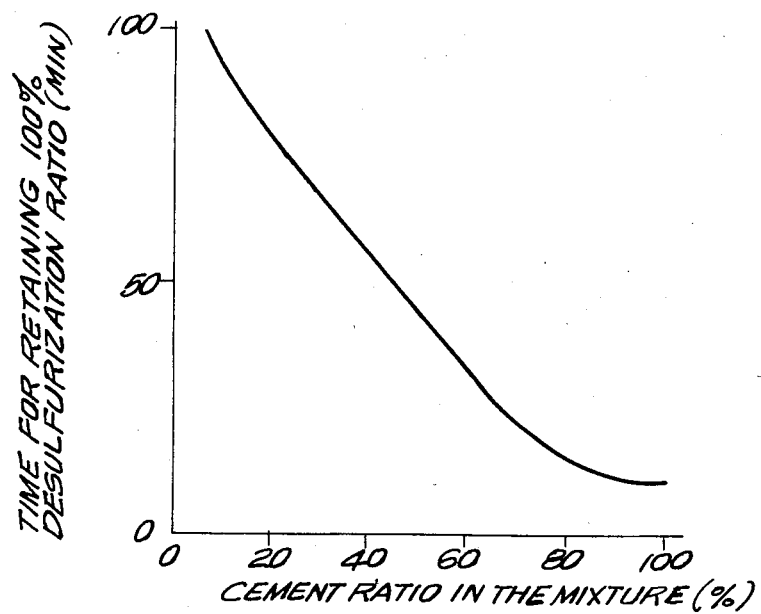
Figure 6:
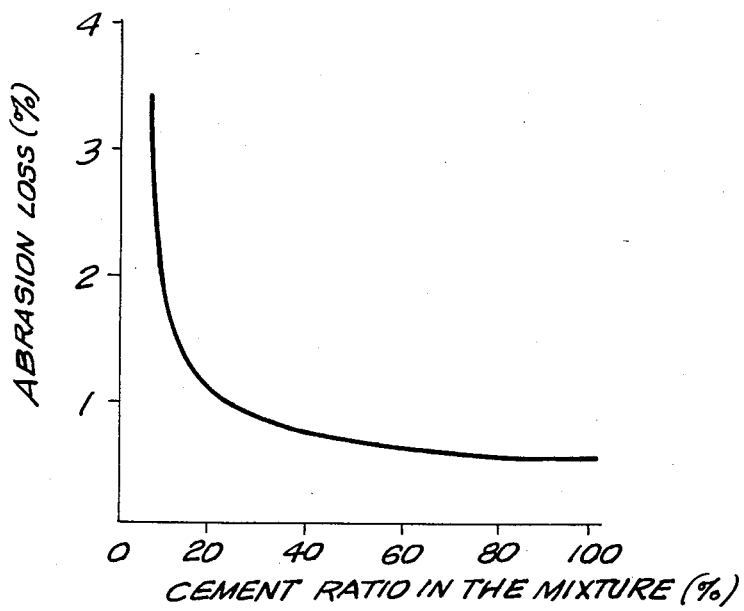

Each mixture was pelletized using a small pan pelletizer (610 mm in diameter, 170 mm in height) with spraying water to prepare pellets of various particle sizes (0.59 mm–3.36 mm). The pellets were cured at a temperature of 20° C.±3° C. and a relative humidity of higher than 80% for 24 hours and, thereafter, dried at 105° C. for 24 hours. An absorption test for $SO_2$ was carried out for the pellets in 1.19 mm–1.68 mm in size from each of the test samples under the same conditions as in Experimental Example 1. The results of the test are shown in FIG. 5. In addition, a fluidizing test was carried out for the pellets of 1.19 mm–1.68 mm in size from each of the test samples and the abrasion loss in the medium due to fluidizing was measured. The results of the measurement are shown in FIG. 6.

Conditions for the fluidizing test are shown below:
Fluidized bed temperature: 850° C.
Fluidizing gas: air
Fluidized bed cross-sectional area: 7.09 cm$^2$
Fluidizing velocity: 0.7 m/sec
Fluidizing time: 2 hours As can be seen from FIG. 5, the desulfurizing performance of the desulfurizing agent is excellent if the amount of cement in the mixture is less than 70%, and it is also apparent from FIG. 6 that the abrasion loss in the medium is increased due to fluidizing at high temperature if the amount of the cement is less than 10 wt. %. Accordingly, the preferred amount of cememt in the mixture of limestone or dolomite for producing the desulfurizing agent according to this invention is between 10-70% by weight.

EXPERIMENTAL EXAMPLE 4

The same absorption test for $SO_2$ as in Experimental Example 3 and the measurement for the abrasion loss of the medium due to fluidizing at 850° C. were carried out for the sample as prepared in Experimental Example 3 (Experiment No. 8, cement:limestone=1:4) with respect to three types of pellets (0.71–1.00 mm, 1.00–2.00 mm and 2.00–3.36 mm) in the same manner as in Experimental Example 4. A similar test was also carried out for the samples prepared from limestone and dolomite separately by pulverizing and setting them into the same particle size for the purpose of comparison.

The fluidizing gas velocity for each of the samples in the fluidized bed test is shown in Table 4. The results of the test are shown in FIG. 7 and FIG. 8.

TABLE 4

| Particle Size (mm) | Sample Fluidizing Gas Velocity (m/sec) | | |
| --- | --- | --- | --- |
|  | Experiment No. 7 | Limestone | Dolomite |
| 0.71–1.00 | 0.4 | 0.6 | 0.6 |
| 1.00–2.00 | 0.7 | 1.0 | 1.0 |
| 2.00–3.00 | 2.0 | 3.0 | 3.0 |

Figure 7:
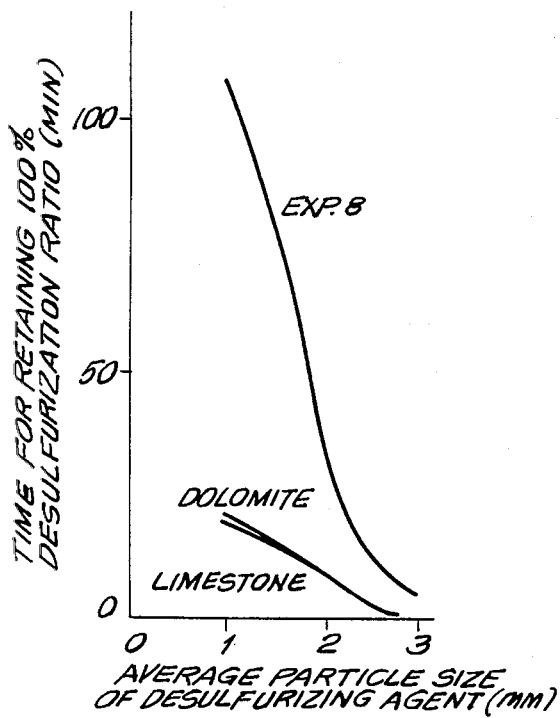
Figure 8:
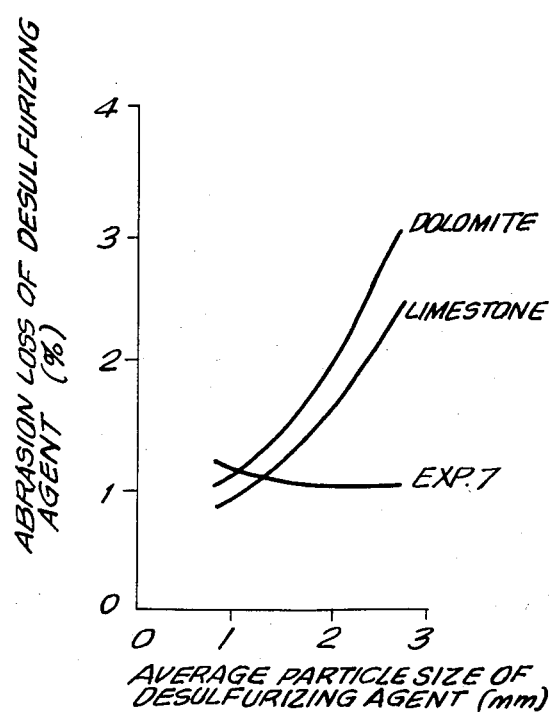

As apparent in FIG. 7, the desulfurizing agent has a satisfactory desulfurizing performance if the particle size is less than 2 mm and, as apparent from FIG. 8, the abrasion loss increases in the limestone and dolomite as the particle size thereof increases. On the other hand, the product according to this invention shows less abrasion loss irrespectively of the particle size.

As apparent from the result of the Experimental Example 4, the preferred particle size for the desulfurizing agent is less than 2 mm when it is used as the heat medium for the fluidized bed and also for removing sulfur compounds such as $SO_2$ or $H_2S$ in the gases. In addition, since the product according to this invention has a high porosity, it can be fluidized with a lower fluidizing gas velocity than that of the prior product. On the other hand, a desulfurizing agent with less than 0.7 mm particle size is not suitable as the heating medium since it has an extremely low fluidizing gas velocity and tends to scatter readily.

An explanation will now be made for a process for producing the desulfurizing agent according to this invention.

Known technics for industrially obtaining a product of predetermined particle size generally include the following means:

(I) a production process by pulverizing the hardened product as prepared in Experimental Example 1, (II) a production process by using the pelletizer as in Experimental Example 2;

(III) a production process by the extrusion molding of the water-kneaded product.

Although the production process (I) can produce a desulfurizing agent having a large porosity and a high desulfurizing performance since a great amount of water can be used for kneading, it requires much energy in the production step for drying, pulverizing and sieving the hardened product, as well as giving an extremely poor yield for the product. The production process (III) requires great installation cost, and in addition, it needs a great amount of kneading water for the extrusion molding, which tends to result in agglomeration of the molding product just after the molding to thereby reduce the yield.

On the other hand, the molding process (II) by using the pelletizer presents no such problems as in processes (I) and (III). In view of the above, the present inventors have made a study of the process for industrially producing the desulfurizing agent at a reduced cost by using the pelletizer and, as the result, have found that pellets of small diameter between 0.7 mm–2.0 mm having a high desulfurizing performance can be produced with each and with a preferred stability by adding as the seed material 5-15% by weight of particles between 0.3 mm-1.2 mm in particle size into the starting powdery material.

The production process will now be explained referring to the following Experimental Examples.

EXPERIMENTAL EXAMPLE 5

Dolomite used in Experimental Example 1 was pulverized into particle size of less than 88μ and blended with blast furnace cement (type A) so that the cement is contained by 10% weight. Silica sand was sieved separately into various particle sizes as described in Table 5 and was added and mixed by 10% by weight into a mixture of dolomite and cement. The mixture of each kind was prepared by 2 Kg respectively. Then the mixture for each kind was pelletized using the same small pan pelletizer as used in Experimental Example 1 while spraying water. The pelletizing conditions are shown below:

Small dish type pelletizer
 pan diameter: 610 mm
 pan height: 170 mm
 pan inclined angle: 55°
 pan rotating speed: 30 rpm
 starting material feeding rate: 20 g/min After curing the pelletizing products at a temperature of 20° C.±3° C. and at a relative humidity of higher than 80% for 3 days, they were dried at 110° C. for 24 hours and then sieved to determine the contents of pellets with the particle size between 0.70 mm-2.00 mm. The results for the measurement are shown in Table 5.

TABLE 5

| Experiment No. | 11 | 12 | 13 | 14 | 15 | 16 |
|---|---|---|---|---|---|---|
| Silica Sand Particle Size (mm) | 0.10–0.30 | 0.30–0.59 | 0.59–0.83 | 0.83–1.19 | 1.19–1.68 | not added |
| Pellets (1.0–2.0 mm) Yield (%) | 35 | 71 | 93 | 85 | 47 | 28 |

As can be seen from Table 4, the preferred particle size for the silica sand to be added as the seed material for the pellets is between 0.3 mm-1.19 mm. If the particle size is smaller than 0.3 mm, no substantial effect is obtained as the seed material. If it is larger than 1.19 mm, the number of seeds per unit weight is decreased, therefore it requires greater amount of silica sand to be added. Generally, the presence of the silica sand has been considered unfavorable so far for the reason that it does not contribute to the desulfurizing performance of the like. However, it has now been confirmed that the desulfurizing performance and the stability as the heat medium of the desulfurizing agent (Experiment No. 11-13) according to this invention are not reduced even by the addition of the silica sand, as the result of the adsorption test for $SO_2$ in a fixed bed at 850° C. and the fluidizing test at 850° C. for the desulfurizing agent obtained by this Experimental Example. As the result of the absorption test for $SO_2$ with respect to the pellets between 1.00-2.00 mm in size under the same conditions as in Experimental Example 4, a 100% desulfurizing ratio was maintained for 73 min.

EXPERIMENTAL EXAMPLE 6

Figure 9:
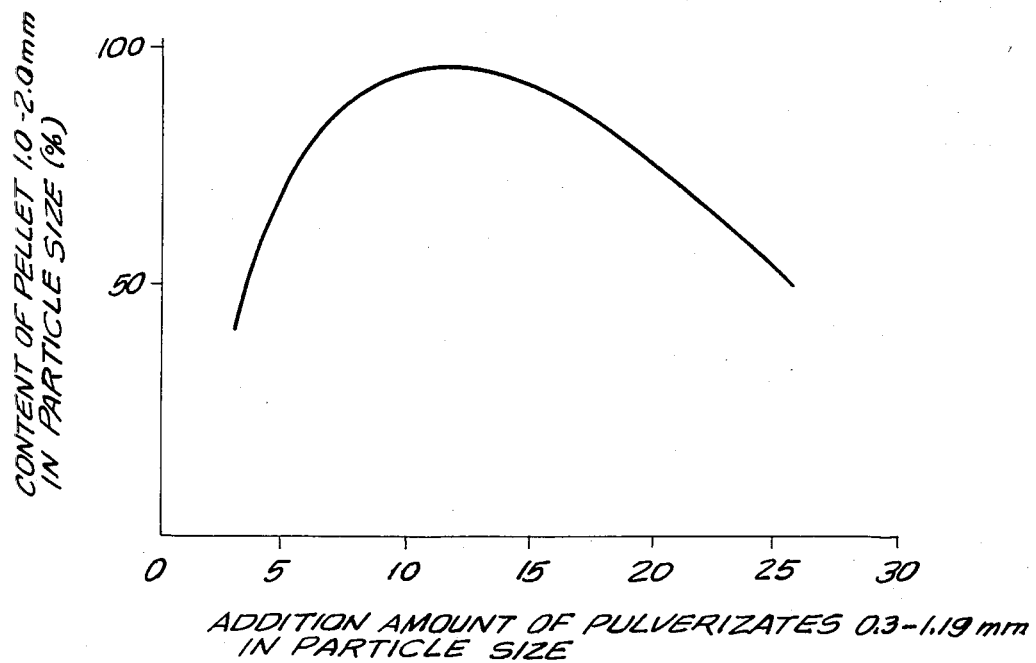

Limestone used in Experimental Example 1 was pulverized and sieved to prepare two kinds of pulverizates of less than 0.3 mm and between 0.3-1.19 mm in particle size respectively. Fly-ash cement (type A) was added to and mixed with the pulverizates of less than 0.3 mm in particle size so as to obtain 33% by weight of the cement. Then 2.5-25% by weight of pulverizates between 0.3 mm-1.19 mm in particle size were added to and mixed with the mixture of limestone and cement to prepare each samples by 2 Kg respectively. A pelletizing test of the mixture was carried out following the same procedures as in Experimental Example 5. The pelletizing products were tightly sealed in a plastic bag, cured within a room for one day and thereafter dried in the room for three days while being left as it was in the form of a thin layer. Then the products were sieved and the content of the pellets between 0.7-2.0 mm in particle size in the total pellets was measured. FIG. 9 shows the results of the measurement. As apparent from FIG. 9, it has been found that pellets between 0.7-2.0 mm in particle size could be produced in a great amount and at a high yield when the additional amount of the coarse particles between 0.3 mm-1.19 mm in particle size is between 5-20% by weight. It has also been confirmed that the desulfurizing performance and the stability as the heat medium of the desulfurizing agent according to this invention are not reduced even when pelletization was conducted by adding the coarse particles to the starting material as the result of the test for $SO_2$ absorption in the fixed bed at 850° C. and the fluidizing test at 850° C. As the result of the test for $SO_2$ absorption carried out for the pellets between 1.00 mm-2.00 mm in particle size under the same conditions as in Experimental Example 4, a 100% desulfurizing ratio could be maintained for 77 min.

As specifically explained in the foregoing Experimental Examples, the hardened product of a mixture comprising limestone powder or dolomite powder and cement according to this invention can effectively remove $SO_2$ or $H_2S$ in exhaust gases and exhibits a more excellent desulfurizing performance as compared with prior art limestone or dolomite when it is used as a heat medium and desulfurizer for the fluidized bed heating furnace.

As the starting material for the desulfurizing agent according to this invention, although a mixture of limestone poweder and dolomite powder or magnesite powder can of course be used, magnesite is expensive and not advantageous.

The cement used as the binder for the desulfurization agent according to this invention includes portland cement, mixed cement and high alumina cement, but the use of high alumina cement as the starting material is not favorable due to its high cost. The preferred mixing ratio of the cement in the mixture of the limestone or dolomite powder and cement is between 10-70% by weight as shown in Experimental Example 3. If the cement content is less than 10% by weight, the abrasion loss when used as the heat medium is undesirably increased.

If the cement content is greater than 70% by weight, the desulfurizing performance is much reduced.

The desulfurizing agent according to this invention, when used as a heating medium and desulfurizer for a fluidized bed heating furnace, exhibits an excellent desulfurizing effect if it is in a particle size of less than 2 mm. Although the desulfuring effect can be increased more as the particle size of the desulfurizing agent is decreased, the fluidizing gas velocity is decreased markedly to easily scatter the desulfurizing agent out of the system if the particle size is less than 0.7 mm. In addition, it is difficult to produce a desulfurizer of less than 0.7 mm in particle size at a low cost. Accordingly, the preferred particle size for the desulfurizing agent actually lies between 0.7 mm and 2 mm.

According to this invention, a suitable method for industrially producing the desulfurizing agent at a good yield and a reduced cost is a rolling pelletization as shown in Experimental Examples 5 and 6, wherein 5-10% by weight of coarse particles of between 0.3 mm-1.2 mm in particle size are added and mixed as the seed material with the starting material and then pelletized under rolling while spraying water on it in a rolling type pelletizer.

The coarse particles usable herein as the seed material include limestone or dolomite as well as silica sand, cement clinker dust, fly-ash and fine sand for concrete. If the particle size of the seed material is less than 0.3 mm, insufficient seed effect is obtained and, on the contrary, if it is larger than 1.2 mm, the seed material has to be used in a great amounts and reduces the desulfurizing performance. Furthermore, addition of the seed material by less than 5% by weight is not desired since the number of seeds to be formed becomes insufficient and pellets larger than 2.0 mm in particle size are easily produced. On the other hand, addition of the seed material by more than 20% by weight is not desired, since this increases the number of pellets of less than 0.7 mm in particle size and reduces the desulfurizing performance.

Limestone or dolomite powder of smaller particle size gives better pelletizing property. If the particle size is too coarse, the pelletizing property is markedly worsened, the strength of the pellets just after the pelletization is decreased and the pellets are liable to be powderized. Powder of less than 0.3 mm in particle size is usually preferred. The pelletizing product, when cured in a humid chamber at ambient temperature for more than one day, develops sufficient strength to be used as a heat medium. Although the pelletizing products after curing can be used as they are for the desulfurizing agent, it is preferable to use them after drying.

While there are various kinds of rolling type pelletizers, the rotational drum or inclined dish type pelletizer may preferably be used for the production of the desulfurizing agent according to this invention.

EXAMPLE

The same limestone as used in Experimental Example 1 was pulverized to prepare finely pulverized products (11% of 88 μm residue) and coarser particles of between 0.3 mm-1.19 mm in particle size. The ordinary portland cement was blended so as to obtain the mixing ratio of finely pulverized limestone; coarse particles: cement = 68:12:20 by weight, and they were mixed in a nauta mixer. The mixture was produced by two tons.

The mixture was pelletized in a rotary drum type pelletizer (600 mm in diameter and 3000 mm in length) while spraying water. After curing the pelletizing products in a hopper for three days, they were taken out and dried in a rotary drier using hot air streams at 150°-250° C. By sieving them, pellets between 0.71 mm-2.00 mm in particle size were obtained at 95% yield. A desulfurizing test was carried out for the pellets in the fluidized bed.

FLUIDIZED BED—Test 1

The desulfurizing agent according to this invention (0.71 mm-2.00 mm) was charged in a bed thickness of about 600 mm in a fluidized bed combustion furnace ($\phi$=450 mm) and oil cokes (sulfur content: 4.9%) were burnt. The furnace was operated at a temperature for the fluidized bed of 800°-850° C. while feeding the oil cokes at 8.0 kg/h. The ratios of air in the exhaust gas was 1.10-1.25. The desulfurizing ratio was greater than 93% at Ca/S=2.5 (molar ratio) based on the amount of the desulfurizing agent supplied and the analytical result for the sulfur content in the exhaust gas. The scattered amount of the desulfurizing agent was about 1.8% of the charged amount based on the result of chemical analysis for the scattered dust. As the result of a similar test carried out for the limestone particles between 0.7 mm-2.38 mm in particle size, the ratios of limestone required for attaining more than 93% desulfurizing ratio was Ca/S=5.5 (molar ratio) and the scattered amount of the desulfurizing agent was about 6.5% of the charged amount.

FLUIDIZED BED - Test 2

The same combustion furnace as used in the fluidized bed test 1 was operated while gasifying oil cokes (sulfur content: 4.9%) at the air ratio in the exhaust gas between 0.8-0.9. The desulfurizing agent was charged in the furnace so that the bed thickness of the heat medium was about 600 mm. The temperature for the fluidized bed was controlled to 800°-850° C. As the analytical result for $H_2S$ in the exhaust gas, a desulfurizing ratio of more than 90% could be attained at Ca/S=2.0 (molar ratio) by the use of the desulfurizing agent according to this invention and the scattered amount of this agent was 2.1%. By the use of the limestone particles in the same particle size, a desulfurizing rate of more than 90% was attained at Ca/S=6 (molar ratio) and the scattered amount was 6.2%.

What is claimed is:

1. A desulfurizing method for removing at least one of $H_2H$ and $SO_2$ from combustion exhaust gases comprising contacting said combustion exhaust gases with a desulfurizing heating agent in a fluidized bed, said heating agent comprising a hardened material of 0.7 to 2 mm in particle diameter prepared by mixing 10 to 70% by weight of cement with limestone or dolomite as the balance and hardening the resulting mixture by adding water.

2. A desulfurizing method as claimed in claim 1, wherein said mixture, before hardening, has a particle diameter of less than 0.3 mm, and about 5 to 20% by weight of a seed material of 0.3 to 1.2 mm in particle diameter is added, and the resulting mixture hardened by adding water.

* * * * *